United States Patent
Fujita et al.

(10) Patent No.: US 10,864,478 B2
(45) Date of Patent: Dec. 15, 2020

(54) CARBON DIOXIDE CAPTURE SYSTEM AND A METHOD OF OPERATING A CARBON DIOXIDE CAPTURE SYSTEM

(71) Applicant: KABUSHIKI KAISHA TOSHIBA, Minato-ku (JP)

(72) Inventors: Koshito Fujita, Kanagawa (JP); Mitsuru Udatsu, Kanagawa (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 45 days.

(21) Appl. No.: 15/341,538

(22) Filed: Nov. 2, 2016

(65) Prior Publication Data

US 2017/0165603 A1     Jun. 15, 2017

(30) Foreign Application Priority Data

Dec. 14, 2015  (JP) ................................ 2015-243406

(51) Int. Cl.
*B01D 53/18* (2006.01)
*B01D 53/14* (2006.01)

(52) U.S. Cl.
CPC ......... *B01D 53/18* (2013.01); *B01D 53/1406* (2013.01); *B01D 53/1412* (2013.01); *B01D 53/1475* (2013.01); *B01D 2252/204* (2013.01); *Y02A 50/20* (2018.01); *Y02C 20/40* (2020.08)

(58) Field of Classification Search
None
See application file for complete search history.

(56) References Cited

U.S. PATENT DOCUMENTS

| 5,190,665 A * | 3/1993 | Titmas | B01D 19/0015 |
| | | | 210/743 |
| 6,883,327 B2 * | 4/2005 | Iijima | B01D 53/1475 |
| | | | 60/649 |
| 2007/0283813 A1 * | 12/2007 | Iijima | B01D 53/1406 |
| | | | 96/235 |
| 2008/0159937 A1 * | 7/2008 | Ouimet | B01D 53/1475 |
| | | | 423/230 |

(Continued)

FOREIGN PATENT DOCUMENTS

| CN | 101314102 A | 12/2008 |
| CN | 202666657 U | 1/2013 |

(Continued)

OTHER PUBLICATIONS

Translation of CN-103055527-A, accessed Sep. 14, 2018 (Year: 2013).*

(Continued)

*Primary Examiner* — Christopher P Jones
*Assistant Examiner* — Phillip Y Shao
(74) *Attorney, Agent, or Firm* — Oblon, McClelland, Maier & Neustadt, L.L.P.

(57) ABSTRACT

A carbon dioxide capture system includes a first capture system and a second capture system. The first capture system including a first absorber that causes carbon dioxide contained in a combustion exhaust gas to be absorbed in a first absorbing liquid. The second capture system causes carbon dioxide contained in a combustion exhaust gas to be absorbed in a second absorbing liquid. The second rich liquid releases carbon dioxide at a lower temperature than the first rich liquid.

4 Claims, 7 Drawing Sheets

(56) References Cited

U.S. PATENT DOCUMENTS

| | | | | |
|---|---|---|---|---|
| 2008/0223215 A1* | 9/2008 | Iijima | ............... | B01D 53/1425 |
| | | | | 95/183 |
| 2012/0009114 A1* | 1/2012 | Chen | ................. | B01D 19/0005 |
| | | | | 423/437.1 |
| 2013/0255484 A1* | 10/2013 | Hiwale | .................... | B01D 3/38 |
| | | | | 95/16 |

FOREIGN PATENT DOCUMENTS

| | | | |
|---|---|---|---|
| CN | 103055527 A | * | 4/2013 |
| JP | 2008-069040 | | 3/2008 |
| JP | 2008-69040 A | | 3/2008 |

OTHER PUBLICATIONS

Australian Office Action dated Oct. 30, 2017 in Australian Patent Application No. 2016269404.

\* cited by examiner

CARBON DIOXIDE CAPTURE SYSTEM AND A METHOD OF OPERATING A CARBON DIOXIDE CAPTURE SYSTEM

CROSS-REFERENCE TO RELATED APPLICATION

This application is based upon and claims the benefit of priority from Japanese Patent Application No. 2015-243406, filed on Dec. 14, 2015, the entire content of which is incorporated herein by reference.

FIELD

The present invention disclosures are directed to a carbon dioxide capture system that captures carbon dioxide from combustion exhaust gas.

BACKGROUND

In recent years, the greenhouse effect of carbon dioxide in combustion exhaust gas generated upon combustion of fossil fuels has been one of the major causes of global warming. Countries may address reductions of greenhouse gas emissions based on the Kyoto Protocol to the United Nations Frameworks Convention on Climate Change to solve the problem.

Under such a circumstance, the study has been in progress on a carbon dioxide capture system that prevents the release into the air of carbon dioxide contained in combustion exhaust gas generated upon the combustion of a fossil fuel at thermal plants or other facilities where a large amount of the fossil fuel is consumed. Such a carbon dioxide capture system, after bringing the combustion exhaust gas into contact with an amine absorbing liquid, separates the carbon dioxide from the combustion exhaust gas and captures the separated carbon dioxide.

Specifically, the carbon dioxide capture system includes an absorber and a stripper. The absorber causes the carbon dioxide contained in the combustion exhaust gas to be absorbed in the amine absorbing liquid as Japanese Patent Laid-open Publication No. 2004-323339 discloses. The stripper heats the absorbing liquid (rich liquid) containing the absorbed carbon dioxide and supplied from the absorber, causes the carbon dioxide to be released from the rich liquid, and regenerates the absorbing liquid. The stripper is coupled to a reboiler configured to supply a heating source, and the rich liquid is heated within the stripper. The absorbing liquid (lean liquid) regenerated in the stripper is supplied to the absorber. The absorbing liquid circulates within the system.

As explained above, the stripper heats the absorbing liquid (rich liquid) to release the carbon dioxide. Generally, the higher the temperature that the stripper heats the rich liquid, the more carbon dioxide is released. However, raising the temperature of the rich liquid may need much more heat at the reboiler, which results in an increase in the total recovery energy required to regenerate the rich liquid. Especially, in a larger type of carbon dioxide capture system, an increase in required recovery energy may be increased.

SUMMARY

Accordingly, present embodiments provide a carbon dioxide capture system and a method of operating a carbon dioxide capture system that captures carbon dioxide from combustion exhaust gas efficiently.

In accordance with a presently disclosed aspect, a carbon dioxide capture system includes a first capture system and a second capture system. The first capture system causes carbon dioxide contained in a combustion exhaust gas to be absorbed in a first absorbing liquid. The second capture system causes carbon dioxide contained in a combustion exhaust gas to be absorbed in a second absorbing liquid. The second rich liquid releases carbon dioxide at a lower temperature than the first rich liquid.

It is to be understood that both the foregoing general description and the following detailed description are exemplary and explanatory only and are not restrictive of the embodiments, as claimed.

BRIEF DESCRIPTION OF THE DRAWINGS

The accompanying drawings, which are incorporated in and constitute a part of the specification, illustrate an embodiment of the embodiments and together with the description, serve to explain the principles of the embodiments.

DESCRIPTION OF THE EMBODIMENTS

Figure 1:
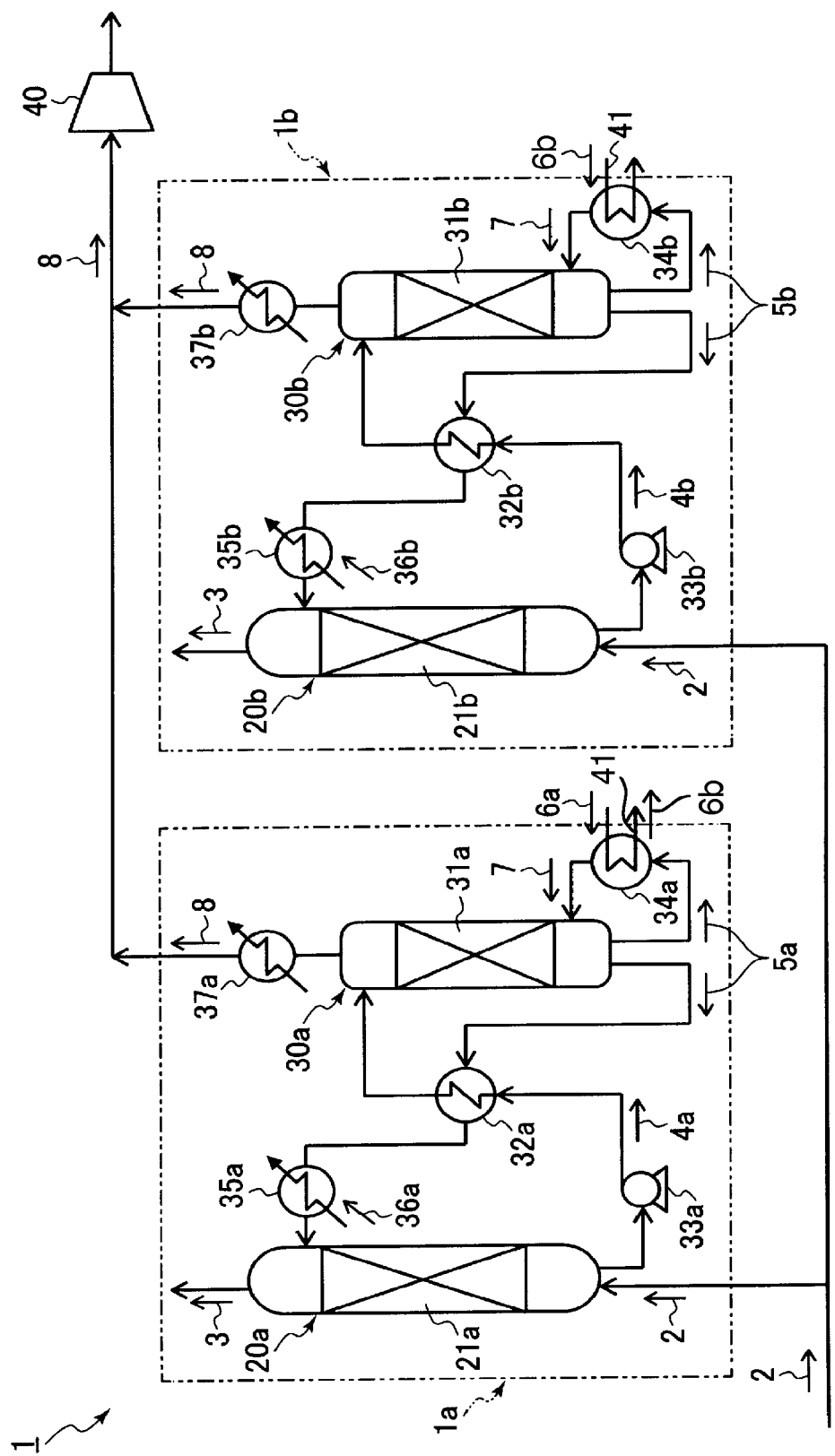
FIG. 1 is a schematic drawing of a first embodiment of a carbon dioxide capture system.

Reference will now be made in detail to the present embodiment, an example of which is illustrated in the accompanying drawing. Wherever possible, the same reference numbers will be used throughout the drawing to refer to the same or like parts.

First Embodiment

FIG. 1 shows a schematic diagram of a carbon dioxide capture system 1 that includes a first capture system 1a and a second capture system 1b.

The first capture system 1a separates the carbon dioxide from the combustion exhaust gas 2 (process gas) and captures the separated carbon dioxide by using a first absorbing liquid explained below. The second capture system 1b separates the carbon dioxide from the combustion exhaust gas 2 and captures the separated carbon dioxide by using a second absorbing liquid explained below. At first, the first capture system 1a is explained.

Figure 2:
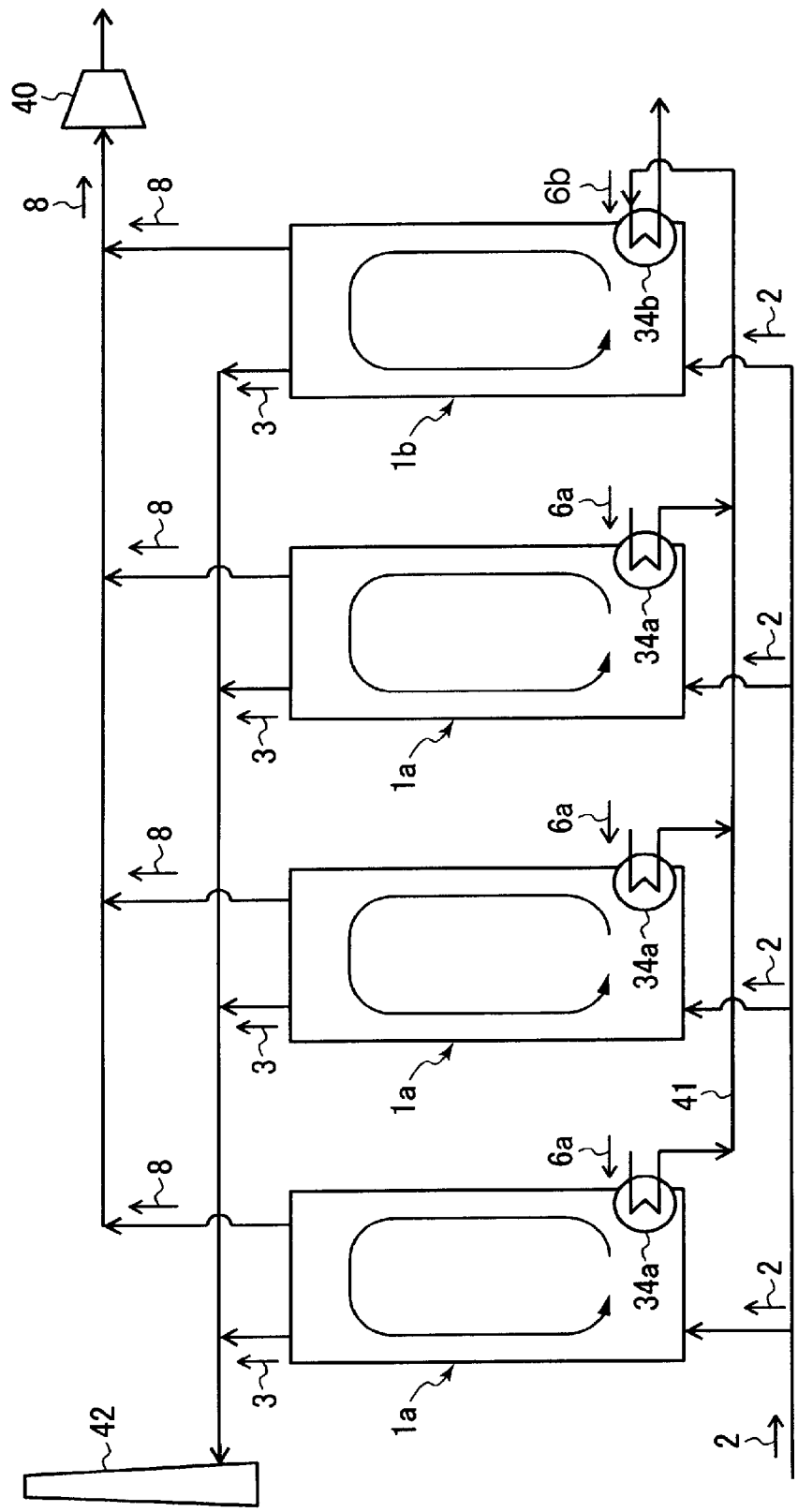
FIG. 2 is a schematic drawing of an alternative implementation of the first embodiment of a carbon dioxide capture system.

As illustrated in FIG. 1, the first capture system 1 includes a first absorber 20a and a first stripper 30a. The first absorber 20a causes carbon dioxide contained in combustion exhaust gas 2 to be absorbed in the first absorbing liquid. The first absorbing liquid containing the absorbed carbon dioxide (a first rich liquid 4a) is supplied to the first stripper 30a. The first stripper 30a causes the carbon dioxide to be released from the first rich liquid and regenerates the first absorbing liquid. The combustion exhaust gas 2 from which the carbon dioxide is absorbed in the absorbing liquid in the first absorber 20a is discharged as decarbonated combustion exhaust gas 3 from the absorber 20a via a chimney 42 as shown in FIG. 2. In addition, the carbon dioxide is discharged as carbon dioxide-containing gas 8 (carbon dioxide-containing steam or superheated steam) together with steam from the first stripper 30a. For the purposes of this disclosure, the term steam is used to mean one or more of steam and superheated steam. The combustion exhaust gas 2 supplied to the first absorber 20a is not limited to but may be combustion exhaust gas discharged from a boiler (not illustrated) of a thermal plant or process exhaust gas. It may be supplied to the first absorber 20a after being subjected to a cooling process as appropriate.

The first absorber 20a includes a carbon dioxide capturer 21a (packed bed). The carbon dioxide capturer 21a causes carbon dioxide contained in the combustion exhaust gas 2 to be absorbed in the first absorbing liquid to produce the first rich liquid 4a. The carbon dioxide capturer 20a is configured as a countercurrent gas-liquid contact device, made using trays or a packed bed in which gas and liquid contact each other, causing the liquid to flow down and the gas to flow up.

The combustion exhaust gas 2 that contains the carbon dioxide discharged from an external source (such as the aforementioned boiler of a thermal plant) is supplied by a blower (not illustrated) to a lower portion of the first absorber 20a and ascends toward the carbon dioxide capturer 21a within the first absorber 20a. The first lean liquid 5a is supplied from the stripper 30 to the carbon dioxide capturer 21a and dropped in the carbon dioxide capturer 21a. In the carbon dioxide capturer 21a, the first lean liquid 5a comes into contact with the combustion exhaust gas 2 and then absorbs the carbon dioxide contained in the combustion exhaust gas 2, generating the first rich liquid 4a.

The generated first rich liquid 4a is temporarily stored in the lower portion of the first absorber 20a and discharged from the lower portion. The combustion exhaust gas 2 further ascends as the decarbonated combustion exhaust gas 3 from the carbon dioxide capturer 21a within the first absorber 20a.

An amine recovery device (not shown) could be provided. The amine recovery device washes the decarbonated combustion exhaust gas 3 by water and recovers the amine in the decarbonated combustion exhaust gas 3. The amine recovery device could be provided inside or outside of the first absorber 30a. In the case that the amine recovery device is provided inside of the first absorber 30a, the amine recovery device provided is provided at upper portion of the carbon dioxide capturer 21a.

A heat exchanger 32a is provided between the first absorber 20a and the first stripper 30a. A first rich liquid pump 33a is arranged between the first absorber 20a and the first heat exchanger 32a. The first rich liquid 4a discharged from the first absorber 20a is supplied by the first rich liquid pump 33a through the first heat exchanger 31 to the first stripper 30. The first heat exchanger 31 causes heat transfer between the first rich liquid 4a supplied to the first stripper 30a and the first lean liquid 5a supplied to the first absorber 20a. The first lean liquid 5a serves as a heating source to heat the first rich liquid 4a to a desired temperature. In other words, the first rich liquid 4a serves as a cooling source to cool the first lean liquid 5a to a desired temperature.

The first stripper 30a includes an amine regenerator 31a (packed bed). The amine regenerator 31a is configured to cause the carbon dioxide to be released from the first rich liquid 4a that has been cooled by the first heat exchanger 32a. The amine regenerator 31a is configured as a countercurrent gas-liquid contact device.

The first stripper 30a is coupled to a first reboiler 34a. The first reboiler 34a uses a first heating medium 6a to heat the first lean liquid 5a supplied from the first stripper 30a to generate steam 7. The reboiler 34a supplies the generated steam 7 to the first stripper 30a. Specifically, a part of the first lean liquid 5a discharged from a lower portion of the first stripper 30a is supplied to the reboiler 34a, while at the same time high-temperature steam is supplied as the heating medium 6a from an external source, such as a turbine (not illustrated), to the first reboiler 34a. The first lean liquid 5a supplied to the reboiler 34a exchanges heat with the heating medium 6a so as to be heated and thus generates the steam 7 from the first lean liquid 5a. The generated steam 7 is supplied to the lower portion of the first stripper 30a and heats the first lean liquid 5a within the first stripper 30a. The heating medium 6a is not limited to the high-temperature steam supplied from the turbine but may also use high-temperature steam supplied from other known steam sources. After the first heating medium 6a passes through the reboiler 34a it is discharged from the reboiler 34a as first discharged heating medium 6b.

The steam 7 is supplied from the first reboiler 34a to the lower portion of the first stripper 30a and ascends toward the amine regenerator 31a within the first stripper 30a. The first rich liquid 4a is dropped into the first stripper 30a at the amine regenerator 31a. In the amine regenerator 31a, the rich liquid 4a comes into contact with the steam 7 to cause the carbon dioxide to be released from the first rich liquid 4a, and thus generate the first lean liquid 5a. The first absorbing liquid is regenerated in the first stripper 30a in this manner.

The generated first lean liquid 5a is discharged from the lower portion of the first stripper 30a. The steam 7 that has come into contact with the rich liquid 4a and contains carbon dioxide is discharged as carbon dioxide-containing gas 8 from an upper portion of the first stripper 30a. The discharged carbon dioxide-containing gas 8 contains steam.

A first lean liquid pump (not illustrated) is provided between the stripper 30a and the heat exchanger 32a. The first lean liquid 5a discharged from the first stripper 30a is supplied by the lean liquid pump through the aforementioned heat exchanger 32a to the first absorber 20a. The first heat exchanger 32a causes the heat transfer between the first lean liquid 5a supplied to the first absorber 20a and the first rich liquid 4a supplied to the first stripper 30a to cool the first lean liquid 5a, as described above. A first lean liquid cooler 35a is provided between the heat exchanger 32a and the first absorber 20a. A cooling medium such as cooling water is supplied from an external component to the first lean liquid cooler 35a. The first lean liquid cooler 35a uses the cooling medium to further cool the first lean liquid 5a cooled by the first heat exchanger 32a to a desired temperature.

The first lean liquid 5a cooled by the first lean liquid cooler 35a is dropped in the first absorber 20a, and is supplied to the carbon dioxide capturer 21a. In the carbon dioxide capturer 21a, the first lean liquid 5a comes into contact with the combustion exhaust gas 2, absorbs the carbon dioxide contained in the combustion exhaust gas 2, and turns into the first rich liquid 4a. In this manner, in the first capture system 1a, the absorbing liquid circulates while repeatedly switching being the first lean liquid 5a and being the first rich liquid 4a.

The first capture system 1a illustrated in FIG. 1 further includes a gas cooler 37a. The gas cooler 37a is configured to cool the carbon dioxide-containing gas 8 discharged from the upper portion of the first stripper 30a by using an externally supplied cooling medium. The cooled carbon dioxide-containing gas 8 is supplied to a compressor 40 explained below.

Next, the second capture system 1b is explained as follows.

The components of the second capture system 1b are similar to the components of the first capture system 1a. As illustrated in FIG. 1, the second capture system 1b includes a second absorber 20b and a second stripper 30b. The second absorber 20b causes carbon dioxide contained in combustion exhaust gas 2 to be absorbed in the second absorbing liquid. The second absorbing liquid containing the absorbed carbon dioxide (a second rich liquid 4b) is supplied to the second stripper 30b. The second stripper 30b causes the carbon dioxide to be released from the first absorbing liquid and regenerates the absorbing liquid.

The second stripper 30b includes an amine regenerator 31b (packed bed). The amine regenerator 31b is configured to cause the carbon dioxide to be released from the second rich liquid 4b. The amine regenerator 31b is configured as a countercurrent gas-liquid contact device.

A heat exchanger 32b is provided between the second absorber 20b and the second stripper 30b. A second rich liquid pump 33b is arranged between the second absorber 30b and the second heat exchanger 32b.

The second stripper 30b is coupled to a second reboiler 34b. The second reboiler 34b uses a heating medium 6b to heat the second lean liquid 5b supplied from the second stripper 30b to generate steam 7. The reboiler 34b supplies the generated steam 7 to the second stripper 30b.

A second lean liquid cooler 35b is provided between the heat exchanger 32b and the second absorber 20b. A cooling medium such as cooling water is supplied from an external source (not shown) to the lean liquid cooler 35b. The second lean liquid cooler 35b uses the cooling medium to cool the second lean liquid 5b. As in the first capture system 1a, the absorbing liquid circulates while cycling between being the second lean liquid 5b and the second rich liquid 4b. The second capture system 1b illustrated further includes a gas cooler 37b. The gas cooler 37b is configured to cool the carbon dioxide-containing gas 8 discharged from the upper portion of the second stripper 30b by using an external cooling medium, such as cooling water that is supplied from a source that is external to the carbon dioxide capture system.

As illustrated in FIG. 1, the first capture system 1 further includes a compressor 40 that compresses the gas 8 cooled by the gas cooler 37a, 37b. In particular, moisture in the carbon dioxide-containing gas 8 is at least partially removed at the gas cooler 37a, 37b, and the carbon dioxide-containing gas 8 becomes mostly carbon dioxide. After undergoing the cooling process, the carbon dioxide-containing gas 8 is supplied to the compressor 40. The carbon dioxide-containing gas 8 is compressed at the compressor 40 and stored in a container (not shown).

Next, the first absorbing liquid used in the first capture system 1a and the second absorbing liquid used in the second capture system 1b are explained.

One type of absorbing liquid may have a low releasing temperature, indicating that the absorbing liquid releases carbon dioxide at a low temperature compared to a basic absorbing liquid. In this embodiment, the second absorbing liquid is selected to release carbon dioxide at a lower temperature than the first absorbing liquid. For example, a general absorbing liquid may release carbon dioxide at 120 degrees Celsius, and the second absorbing liquid may be selected to release carbon dioxide at 100 degrees Celsius. Preferably, the first absorbing liquid and the second absorbing liquid each contain amine composites.

Examples of the first absorbing liquid amine composite could be alcoholic hydroxyl group-containing primary amines such as monoethanolamine, 2-amino-2-methyl-1-propanol, etc.; alcoholic hydroxyl group-containing secondary amines such as diethnolamine, 2-methylaminoethanol, etc., alcoholic hydroxyl group-containing tertiary amines such as triethanolamine, N-methyldiethanolamine, etc., polyethylenepolyamines such as ethylenediamine, triethylenediamine, diethylenetriamine, etc.; cyclic amines such as piperazines, piperidines, pyrrolidines, etc.; polyamines such as xylenediamine, etc.; amino acids such as methylaminocarboxylic acid, etc., and their mixtures. These amines are normally used in the form of 10 to 70 wt % aqueous solutions thereof. Besides, to the absorbing liquid, there may be added a carbon dioxide absorption promoting agent or a corrosion inhibitor. Further, methanol, polyethylene glycol, sulfolane, etc. may also be added to the absorbing liquid as other medium. Above mentioned composite could be also applied to the second absorbing liquid with mixing other composites.

And examples of the second absorbing liquid amine composite are such as N-(2-butyl-)-N-methylamino ethanol, N-(2-pentyl)-N-methylamino ethanol, N-(2-hexyl)-N-methylamino ethanol, N-(3-pentyl)-N-methylamino ethanol, N-(3-hexyl)-N-methylamino ethanol, N-(3-heptyl)-N-methylamino ethanol, N-(4-hextyl)-N-methylamino ethanol, N-(4-octyl)-N-methylamino ethanol, N-(5)-N-methylamino ethanol, N-(2-butyl-)-N-ethylamino ethanol, N-(2-pentyl)-N-ethylamino ethanol, N-(2-hexyl)-N-ethylamino ethanol, N-(3-pentyl-N-ethylamino ethanol, N-(3-hexyl)-N-ethylamino ethanol, N-(3-heptyl)-N-ethylamino ethanol, N-(4-heptyl)-N-ethylamino ethanol, N-(4-octyl)-N-ethylamino ethanol, N-(5-nonyl)-N-ethylamino ethanol, N-(2-butyl-)-N-methylamino propanol, N-(2-pentyl)-N-methylamino propanol, N-(2-hexyl)-N-methylamino propanol, N-(3-pentyl)-N-methylamino-propanol, N-(3-hexyl)-N-methylamino-propanol, N-(3-heptyl)-N-methylamino propanol, N-(4-heptyl)-N-methylamino propanol, N-(4-octyl)-N-methylamino propanol, N-(5-nonyl)-N-methyl-amino-propanol, N-(2-butyl)-N-ethylamino propanol, N-(2-pentyl)-N-ethylamino propanol, N-(2-hexyl)-N-ethylamino propanol, N-(3-pentyl)-N-ethylamino propanol, N-(3-hexyl)-N-ethylamino propanol, N-(3-heptyl)-N-ethylamino propanol, N-(4-heptyl)-N-ethylamino propanol, N-(4-octyl)-N-ethylamino propanol, N-(5-nonyl)-N-ethylamino propanol, N-(2-butyl-)-N-methylamino butanol, N-(2-pentyl)-N-methylamino butanol, N-(2-hexyl)-N-methylamino butanol, N-(3-pentyl)-N-methylamino butanol, N-(3-hexyl)-N-methylamino butanol, N-(3-heptyl)-N-methylamino butanol, N-(4-heptyl)-N-methylamino butanol, N-(4-octyl)-N-methylamino butanol, N-(5-nonyl)-N-methylamino butanol, N-(2-butyl)-N-ethylamino-butanol, N-(2-pentyl)-N-ethylamino butanol, N-(2-hexyl)-N-ethylamino butanol, N-(3-pentyl)-N-ethylamino butanol, N-(3-hexyl)-N-ethylamino butanol, N-(3-heptyl)-N-ethylamino butanol, N-(4-heptyl)-N-ethylamino butanol, N-(4-octyl)-N-ethylamino-butanol, N-(5-nonyl)-N-ethylamino butanol.

Other example of the second absorbing liquid amine composite are such as N-cyclopropyl-N-methyl amino ethanol, N-cyclobutyl-N-methyl amino ethanol, N-cyclopentyl-N-methyl amino ethanol, N-cyclohexyl-N-methyl amino ethanol, N-cycloheptyl-N-methyl amino ethanol, N-cyclooctyl-N-methyl amino ethanol.

As shown in FIG. 1, the first discharged heating medium 6b discharged from the first reboiler 34a is supplied to the second reboiler 34b as the second heating medium 6b. Specially, an outlet of the first reboiler 34a and an inlet of the second reboiler 34b are connected by a first heating liquid supply line 41, and the first discharged heating medium 6b discharged from the first reboiler 34a is used as the second heating medium 6b.

During operation of the carbon dioxide capture system 1, the combustion exhaust gas 2 discharged from a boiler (not shown) is separately introduced into the first capture system 1a and the second capture system 1b.

At the first capture system 1a and the second capture system 1b, the carbon dioxide in the combustion exhaust gas 2 is at least partially removed. The combustion exhaust gas 2 from which the carbon dioxide is at least partially removed is discharged as the decarbonated combustion exhaust gas 3 from the first absorber 20a and the second absorber 20b. In addition, the carbon dioxide is discharged as the carbon dioxide-containing gas 8 from the first stripper 30a and the second stripper 30b, and the carbon dioxide-containing gas 8 is supplied to the compressor 40 via the gas cooler 37a,b. The carbon dioxide-containing gas 8 compressed by the compressor 40 is stored in a container (not shown).

During operation, high-temperature steam is supplied as the first heating medium 6a from an external source, such as a turbine (not illustrated), to the first reboiler 34a. The first lean liquid 5a supplied to the first reboiler 34a exchanges heat with the first heating medium 6a so as to be heated and thus generates the steam 7 from the first lean liquid 5a. The generated steam 7 is supplied to the lower portion of the first stripper 30a and heats the first rich liquid 4a within the first stripper 30a, and the carbon dioxide is released from the first rich liquid 4a.

For example, the heat amount of the first heating medium 6a supplied to the first reboiler 34a is adjusted so that the temperature of the first rich liquid 4a is maintained at or above a temperature at which the first absorbing liquid releases carbon dioxide, for example at or above 120 degrees Celsius. By this process, the carbon dioxide is released from the first rich liquid 4a efficiently.

As shown in FIG. 1, the first discharged heating medium 6b discharged from the first reboiler 34a is supplied to the second reboiler 34b as the second heating medium 6b, which heats the second lean liquid 5b.

In this embodiment, the carbon dioxide releasing temperature of the second rich liquid 4b in the second stripper 30b is lower than the carbon dioxide releasing temperature of the first rich liquid 4a in the first stripper 30a. Therefore, the first discharged heating medium 6b has enough heat to sufficiently raise the temperature of the second lean liquid 5b to create steam 7 that heats the second rich liquid 4b sufficiently to release the carbon dioxide. And since the second lean liquid 5b is heated by the first discharged heating medium 6b, an additional, externally supplied heating medium other than the first discharged heating medium 6b may advantageously be omitted.

Steam 7 is generated from the second lean liquid 5b heated by the first discharged heating medium 6b, and the steam 7 is supplied to the lower portion in the second stripper 30b. In the second stripper 30b, the second rich liquid 4b is heated by the steam 7, and the carbon dioxide is released from the second rich liquid 4b.

The temperature of the second rich liquid 4b is adjusted to be at or above a carbon dioxide releasing temperature of the second rich liquid 4b, for example, at or above 100 degrees Celsius. The second rich liquid 4b is selected to release carbon dioxide at a lower temperature than the first rich liquid 4a. Therefore, at the second stripper 30b, the second rich liquid 4b releases the carbon dioxide by the heat of the steam 7 generated by the first discharged heating medium 6b.

By above process, the first heating medium 6a becomes the first discharged heating medium 6b, which is used for heating the second lean liquid 5b. Thus, the excess heat of the first heating medium 6a, after it is discharged as the first discharged heating medium 6b, is used efficiently at the second reboiler 34b.

The carbon dioxide capture system 1 could be operated so that the efficiency of carbon dioxide captured at the first capture system 1a and the second capture system 1b are almost the same. However, in order to minimize the heat amount supplied from the first discharged heating medium 6b, the percentages of captured carbon dioxide at the first capture system 1a and the second capture system 1b could be adjusted to be different values. For example, the percentage of captured carbon dioxide at the first capture system 1a could be larger than the percentage of captured carbon dioxide at the second capture system 1b. In this case, so that the percentage of captured carbon dioxide as a whole system becomes 90%, the percentage of captured carbon dioxide at the first capture system 1a is adjusted to be 95%, and the percentage of captured carbon dioxide at the second capture system 1b is adjusted to be 85%. Alternatively, the percentage of captured carbon dioxide at the first capture system 1a could be less than the percentage of captured carbon dioxide at the second capture system 1b.

In this embodiment, the temperature of the second rich liquid 4b at the second stripper 30b is generally lower than the temperature of the first rich liquid 4a at the first stripper 30a. Furthermore, the first heating medium 6a discharged from the first reboiler 34a is supplied to the second reboiler 34b as the second heating medium 6b. Thus, the second lean liquid 5b is heated by the first heating medium 6a. As a result, an externally supplied heating medium other than the first heating medium 61 could be omitted. The heat amount of the first discharged heating medium 6b discharged from the first reboiler 34a is used at the second reboiler 34b efficiently. And total energy consumed at the carbon dioxide capture system 1 as a whole is advantageously reduced.

In addition, different types of absorbing liquid may be used as the first absorbing liquid and second absorbing liquid. As a result, low cost absorbing liquid could be applied to at least one of the first absorbing liquid and second absorbing liquid, and the cost of absorbing liquid for the entire system as a whole could be reduced. In addition, in the case the first absorbing liquid and second absorbing liquid have different deterioration characteristics, the timing of exchanging old for new absorbing liquid in the system due to deterioration of each absorbing liquid 4a, 5a could be different, which could be another benefit for system operation.

The case that the first capture system 1a and the second capture system 1b are provided in parallel was explained above. However, as shown FIG. 2, plural of the first capture systems 1a could be provided in parallel to a second capture system 1b. In this case, the first discharged heating medium 6b discharged from one or more of the parallel first reboiler 34a is supplied to the second reboiler 34b in the second capture system 1b. This case also reduces the amount of energy of the carbon dioxide capture system 1 as a whole. Furthermore, multiple of the second capture system 1b could be provided in parallel. And more than 3 types of the capture system could be provided and connected in order by using more than 3 types of absorbing liquid which have different carbon dioxide release temperature with respect to each other.

Second Embodiment

Figure 3:
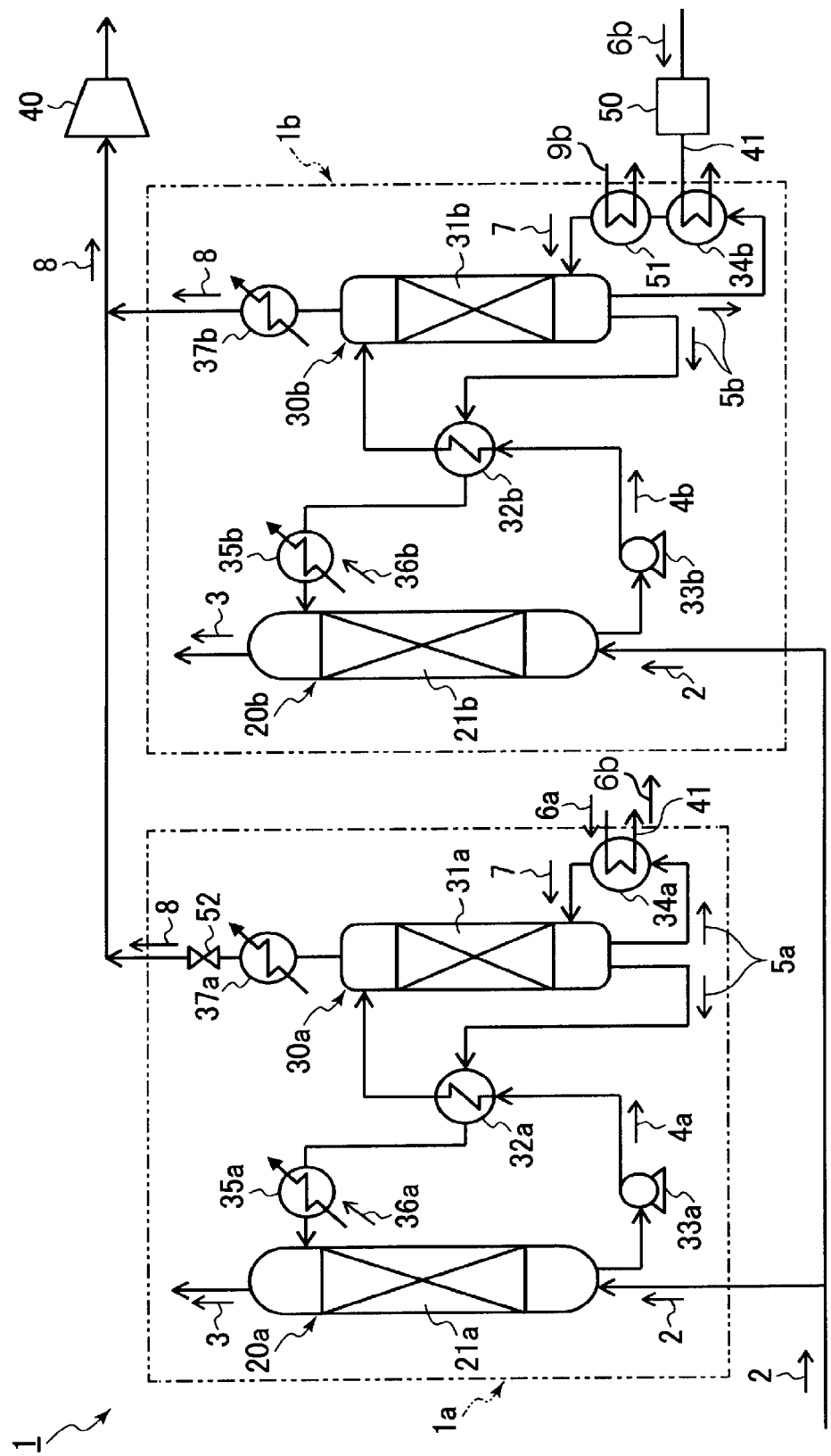
FIG. 3 is a schematic drawing of a second embodiment of a carbon dioxide capture system.

FIG. 3 shows a schematic diagram of a second embodiment of the carbon capture system. The carbon dioxide capture system 1 further includes a flashing device 50. The flashing device 50 is provided at the first heating medium supply line 41, and flashes the first heating medium 6a by pressure reduction. The pressure of inside of the flashing device 50 is maintained lower than the pressure of an inside of the first heating medium supply line 41. And, the first heating medium 6a may include high temperature and high pressure drain water. When the first heating medium 6a is introduced in the flashing device 50, a portion of the first heating medium 6a evaporates by pressure reduction.

The first heating medium 6a has a relatively high temperature when it is supplied from the turbine (not shown) to the first reboiler 34a. However, the temperature of the first heating medium 6a is decreased by heating the first lean liquid 5a at the first reboiler 34a, and a portion of the first discharged heating medium 6b could condense and liquefy. Therefore, by flashing the first discharged heating medium 6b by the flashing device 50, the first discharged heating medium 6b is at least partially vaporized, and efficiency of heat exchanging between the first discharged heating medium 6b and the second lean liquid 5b at the second reboiler 34b is improved.

As shown in FIG. 3, the third reboiler 51 could be provided to heat the second lean liquid 5b. Even if the heat amount of the first discharged heating medium 6b, after being flashed, is too low for heating the second lean liquid 5b, the third reboiler 51 adds sufficient heat to the first discharged heating medium 6b to heat the second lean liquid 5b.

As with the first heating medium 6a in the first embodiment, high temperature steam supplied from an external source, such as a low pressure turbine source (not shown) could be used as the heating medium 9b supplied to the third reboiler 51. The third reboiler 51 also could be provided in other embodiments.

The pressure in the first stripper 30a could be higher than the pressure in the second stripper 30b. In this case, a maintenance bulb 52 could be provided. By adjusting the opening of the maintenance bulb 52, the pressure in the first stripper 30a is controlled. Reducing the size of an opening of the maintenance bulb 52 may cause the pressure in the first stripper 30a to increase, and may also cause the temperature of the first rich liquid 4a to increase in the first stripper 30a.

The first rich liquid 4a may be a general absorbing liquid that releases carbon dioxide at a selected temperature, for example at 120 degrees Celsius. As the pressure in the first stripper 30a is increased, the temperature at which the first rich liquid 4a releases carbon dioxide also increases. For example, at 200 KPa in the first stripper 30a, the first rich liquid 4a releases carbon dioxide at 120 degrees Celsius. Or for example, at 100 KPa in the first stripper 30a, the first rich liquid 4a releases carbon dioxide at 90 degrees Celsius. The second capture system 1b uses the second absorbing liquid that releases carbon dioxide at a lower temperature than the first absorbing liquid. Therefore, the pressure in the second stripper 30b could be set at the same or a lower pressure than the first stripper 30a. In other embodiment, the pressure in the first stripper 30a could be set higher than the pressure of the second stripper 30b.

In this embodiment, the flashing device 50 flashes the first discharged heating medium 6b by reduction of pressure. The pressure of an inside of the flashing device 50 is maintained lower than the pressure of an inside of the first heating medium supply line 41. Thus, even in the condition that the portion of the first discharged heating medium 6b is condensed and liquefied, the first discharged heating medium 6b is evaporated by flashing in the flashing device 50, and the efficiency of the heat exchange between the second lean liquid 5b and the first discharged heating medium 6b is improved.

Third Embodiment

Figure 4:
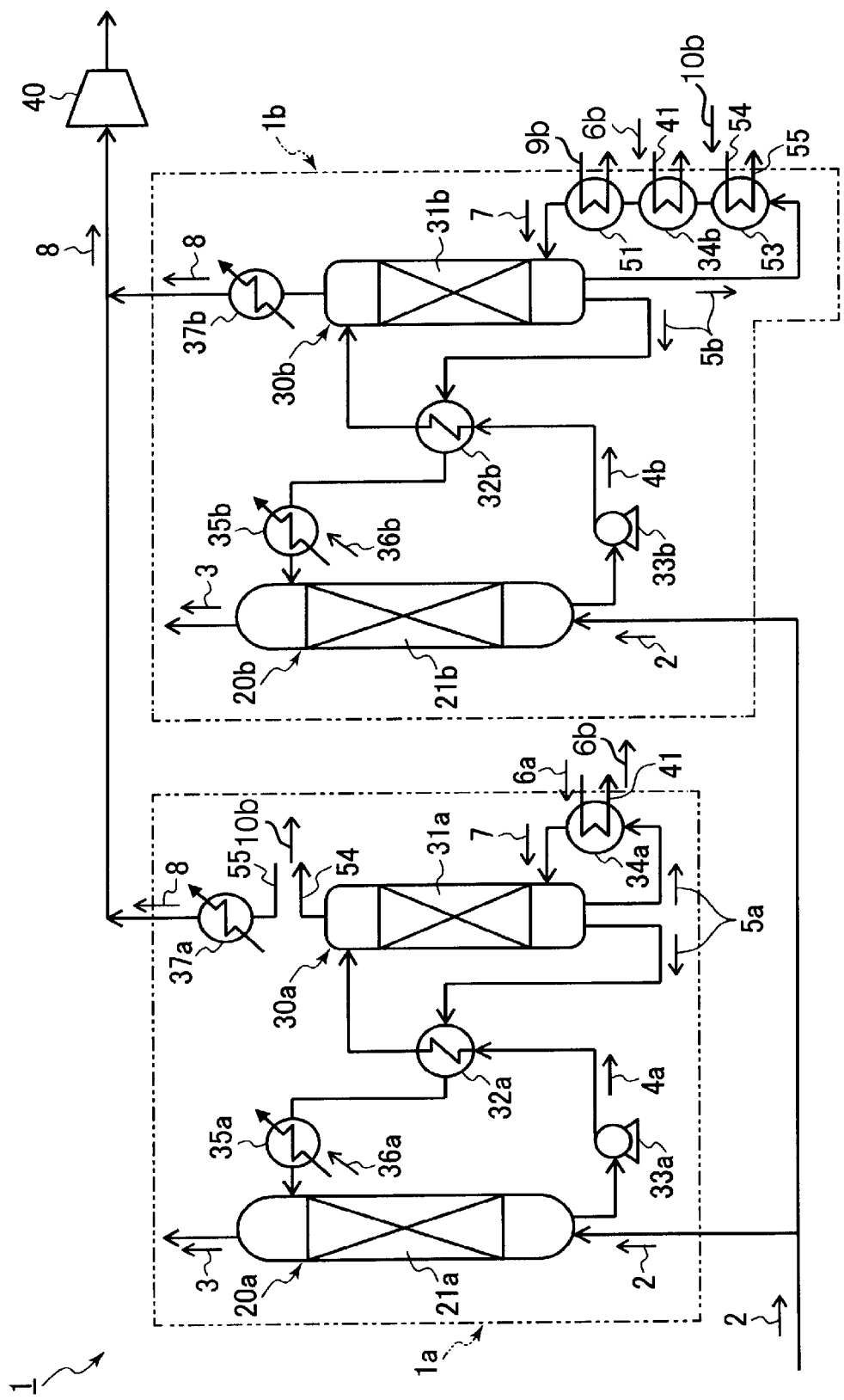
FIG. 4 is a schematic drawing of a third embodiment of a carbon dioxide capture system.

FIG. 4 shows a schematic diagram of the carbon dioxide capture system according to a third embodiment. In this embodiment, as shown in FIG. 4, the second capture system 1b further includes a fourth boiler 53 as compared to the first embodiment. The fourth boiler 53 heats the second lean liquid 5b by the carbon dioxide-containing gas 10b discharged from the first stripper 30a. The fourth boiler 53 is provided upstream of the second reboiler 34b. Thus, the second lean liquid 5b is heated by the fourth reboiler 53, the second reboiler 34b, and the third reboiler 51, in that order.

The top portion of the first stripper 30a and the inlet of the fourth reboiler 53 are connected by a carbon dioxide-containing gas supply line 54. And the outlet of the fourth reboiler 53 and the first gas cooler 37a are connected by the carbon dioxide-containing gas discharge line 55. By this components, the carbon dioxide-containing gas 10b discharged from the first stripper 30a is supplied to the fourth reboiler 53 via the carbon dioxide-containing gas supply line 54.

In this embodiment, the carbon dioxide releasing temperature of the second rich liquid 4b in the second stripper 30b may be lower than the carbon dioxide releasing temperature of the first rich liquid 4a in the first stripper 30a. Therefore, the carbon dioxide-containing gas 10b discharged from the first stripper 30a has an amount of heat that is capable of heating the second lean liquid 5b at the fourth reboiler 53. The second lean liquid 5b is heated by heat exchanging with the carbon dioxide-containing gas 10b. After heating, the carbon dioxide-containing gas 10b is discharged from the fourth reboiler 53 and supplied to the first gas cooler 37a via the carbon dioxide-containing gas discharge line 55.

In this embodiment, the second lean liquid 5b is heated by heat exchanging with the carbon dioxide-containing gas 10b. By this process, an excess heat amount of the carbon dioxide-containing gas 10b is used at the fourth reboiler 53 efficiently, and recovery energy of the carbon dioxide capture system 1 as a whole is reduced.

Furthermore, the carbon dioxide-containing gas 10b discharged from the first stripper 30a is cooled at the fourth reboiler 53. By this process, the cooling capacity, such as amount of cooling medium, at the first gas cooler 37 may advantageously be reduced.

This embodiment is not limited to the case that the second rich liquid 5b flows through the fourth reboiler 53, the second reboiler 34b, the third reboiler 51, in that order, as explained above. For example, if the fourth reboiler 53 and the second reboiler 34b have enough heat to sufficiently heat the second lean liquid 5b, the third reboiler 51 could be omitted.

Fourth Embodiment

Figure 5:
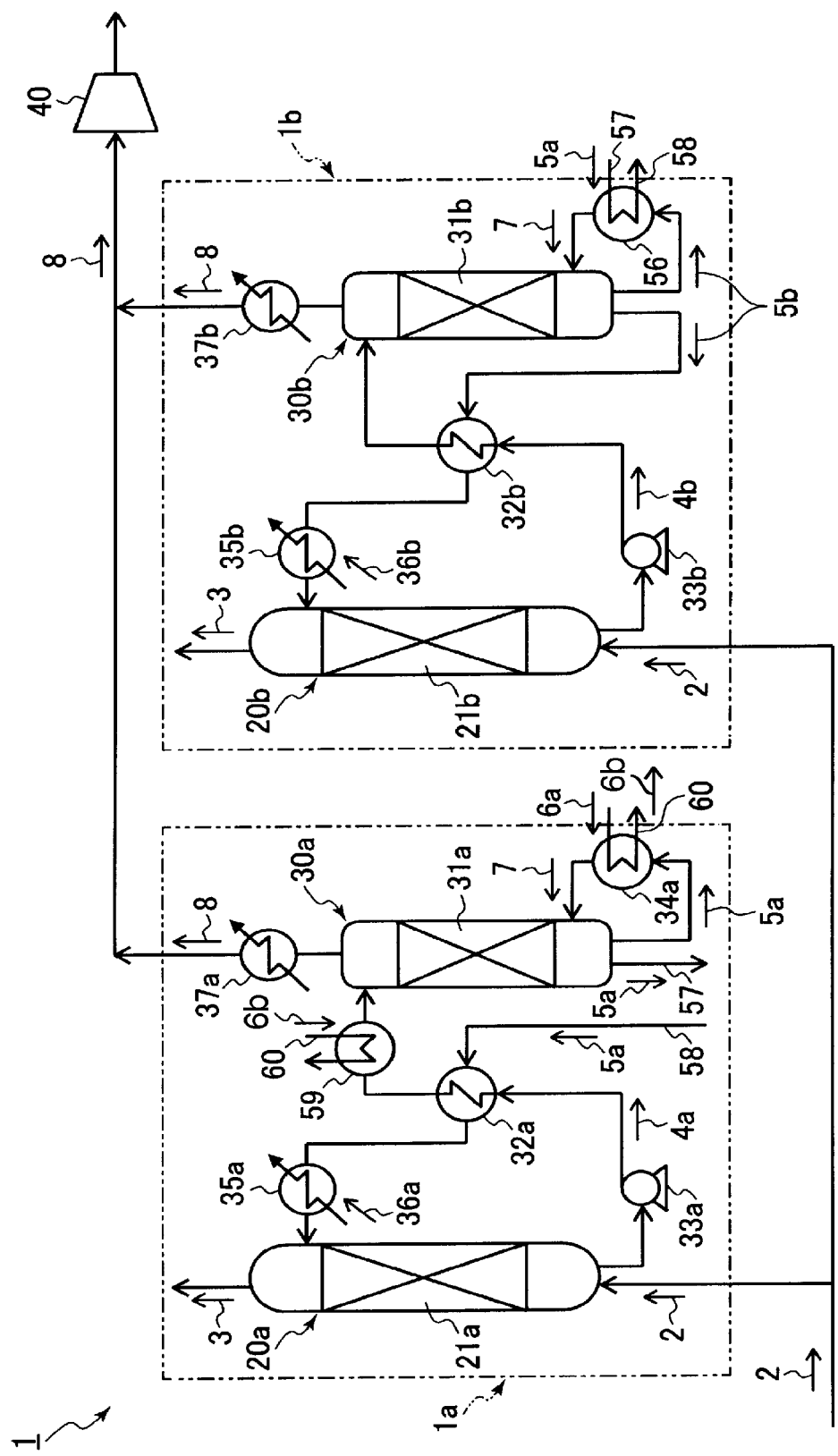
FIG. 5 is a schematic drawing of a fourth embodiment of a carbon dioxide capture system.

In this embodiment, as shown in FIG. 5, the second capture system 1b further includes a fifth boiler 56 as compared to the first embodiment. The fifth boiler 56 heats the second lean liquid 5b by the first lean liquid 5a discharged from the first stripper 30a. After heating the second lean liquid 5b, the first lean liquid 5a is supplied to the first absorber 20a via the first heat exchanger 32a.

Specially, the bottom portion of the first stripper 30a and the inlet of the fifth reboiler 56 are connected by the first lean liquid supply line 57. And the outlet of the fifth reboiler 56 and the first exchanger 32a is connected by the first lean liquid discharge line 58. By these components, the first lean liquid 5a discharged from the first stripper 5a is supplied to the fifth reboiler 56.

In this embodiment, the carbon dioxide releasing temperature of the first rich liquid 4b in the second stripper 30b is lower than the carbon dioxide releasing temperature of the first rich liquid 4a in the first stripper 30a. Therefore, the first rich liquid 4a discharged from the first stripper 30a has an amount of heat that is capable of heating the second lean liquid 5b at the fifth reboiler 56. The second lean liquid 5b is heated by heat exchanging with the first rich liquid 4a. After heating, the first rich liquid 4a is discharged from the fifth reboiler 56 and supplied to the first heat exchanger 32a via the first lean liquid discharge line 58.

As shown in FIG. 5, the first rich liquid 4a supplied to the first stripper 30a from the first heat exchanger 32a may preferably be heated. Therefore, a heater 59 could be provided between the first heat exchanger 32a and the first stripper 30a. The first rich liquid 4a is heated by the heater 59, and supplied to the first stripper 30a.

The heater 59 heats the first rich liquid 4a by using the first discharged heating medium 6b discharged from the first reboiler 34a. Specially, the outlet of the first reboiler 34a and the inlet of the heater 59 are connected by the first heating medium supply line 60. By these components, the first discharged heating medium 6b discharged from the first reboiler 34a is supplied to the heater 59 via the first heating medium supply line 60. After the first heating medium 6a heats the first lean liquid 5a at the first reboiler 34a, the first discharged heating medium 6b is supplied to the heater 59 to heat the first rich liquid 4a.

By heat exchange at the fifth reboiler 56, the temperature of the first lean liquid 5a could be reduced, which could otherwise cause the temperature of the first rich liquid 4a supplied to the first stripper 30a from the first heat exchanger 32a to be too low. However, by heating the first rich liquid 4a by the heater 59, the temperature of the first rich liquid 4a is sufficiently raised.

An additional heater (not shown) could be provided between the heater 59 and the first stripper 30a. In this case, the first rich liquid 4a discharged from the first stripper 30a is heated by the additional heater. By this process, even in the condition that the first rich liquid 4a is not heated to a sufficient temperature by the heater 59, the additional heater heats first rich liquid 4a to the sufficient temperature. The additional heater could use steam supplied from external components (such as low pressure turbine) as heat medium, or could use another source as a heat medium.

In this embodiment, instead of the heater 59, the second reboiler 34b (shown in FIG. 1) could be provided at a position downstream of the fifth reboiler 56. In the case the heat amount supplied to the fifth reboiler from the first lean liquid 5a is insufficient to adequately heat the second lean liquid 5b, the second reboiler 34b could heat the second lean liquid 5b further.

As in the first embodiment, the first discharged heating medium 6b discharged from the first reboiler 34a may preferably be supplied to the second reboiler 34b as the second heating medium. And the third reboiler 51 and fourth reboiler 53 could be provided at positions downstream of the fifth reboiler 56. In this case, the heater 59 could heat the first rich liquid 4a. Here, in case the fourth reboiler 53 has less capacity than the fifth reboiler 56, the fourth reboiler 53 is preferably provided upstream of the fifth reboiler 56.

In this embodiment, the second lean liquid 5b is heated at the fifth boiler 56 by the first lean liquid 5a discharged from the first stripper 30a. By this process, the heat amount of the first lean liquid 5a discharged from the first stripper 30a is used efficiently at the fifth reboiler 56. Thus, recovery energy of the carbon dioxide capture system 1 as a whole system is reduced.

Furthermore, the heater 59 heats the first rich liquid 4a supplied to the first stripper 30a from the first absorber 20a. By this process, even in the case that the temperature of the first lean liquid 5a becomes low temperature by heat exchange, the temperature of the first rich liquid 4a could be raised. And the heat amount of the first heating medium 6a is used efficiently. Thus, recovery energy of the carbon dioxide capture system 1 as a whole system could be reduced.

Fifth Embodiment

Figure 6:
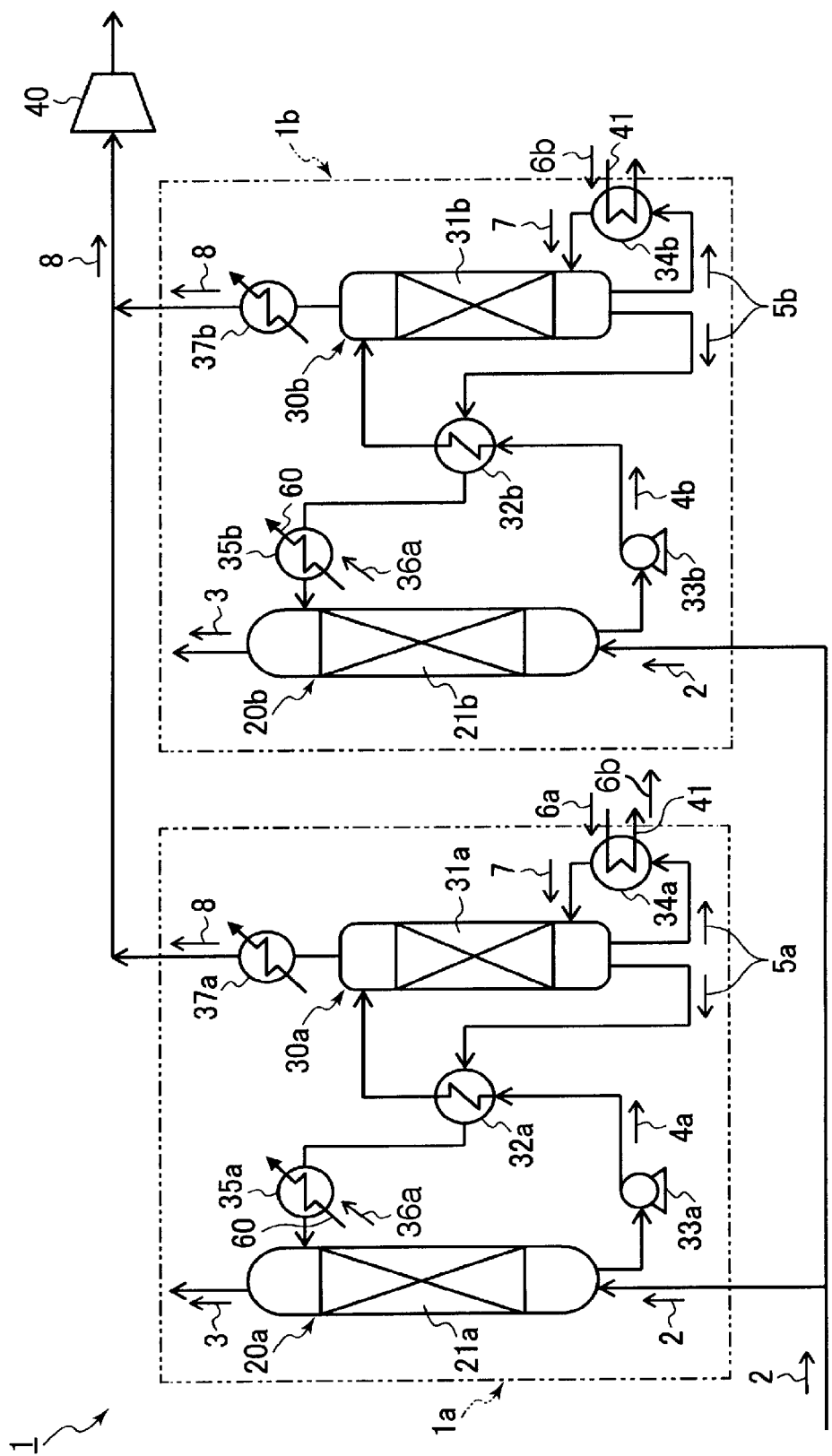
FIG. 6 is a schematic drawing of a fifth embodiment of a carbon dioxide capture system.

In this embodiment, as shown in FIG. 6, the first cooling medium 36a discharged from the second lean liquid cooler 35b is supplied to the first lean liquid cooler 35a as the first cooling medium 36a. Especially, the outlet of the second lean liquid cooler 35b and the inlet of the first lean liquid cooler 35a are connected by the cooling medium supply line 60. By these components, the first lean liquid 5a supplied to the first absorber 20a is cooled by the first cooling medium 36a at the first lean liquid cooler 35a.

In this embodiment, the carbon dioxide releasing temperature of the second rich liquid 4b in the second stripper 30b is lower than the carbon dioxide releasing temperature of the first rich liquid 4a in the first stripper 30a. Therefore, the temperature of the second lean liquid 5b supplied to the second absorber 20b tends to be lower than the temperature of the first lean liquid 5a supplied to the first absorber 20a. And, the temperature of the first cooling medium 36a discharged from the second lean liquid cooler 35b becomes a low temperature capable of cooling the first lean liquid 5a. As a result an externally supplied cooling medium to cool the first lean liquid 5a may advantageously be omitted.

An additional cooler (not shown) could be provided between the first lean liquid cooler 35a and the first absorber 30a. In this case, the first lean liquid 5a discharged from the first lean liquid cooler 35a is cooled by the additional cooler. By this process, even in the condition that the first lean liquid is not cooled sufficiently by the first lean liquid cooler 35a, the additional cooler cools the first lean liquid 5a further. For example, the additional cooler could use cooling water supplied from external components as a cooling medium.

In this embodiment, the first cooling medium 36a is discharged from the second lean liquid cooler 35b and supplied to the first lean liquid cooler 35a as the first cooling medium 36a. By this process, an externally supplied cooling medium as the first cooling medium 36a is omitted. And amount of cooling medium as a whole system is reduced. Instead of the case of the first discharged heating medium 6b being supplied to the second reboiler 34b, external steam such as turbine (not shown) could be supplied to the second reboiler 34b instead of using the first discharged heating medium 6b discharged from the first reboiler 34a.

Sixth Embodiment

Figure 7:
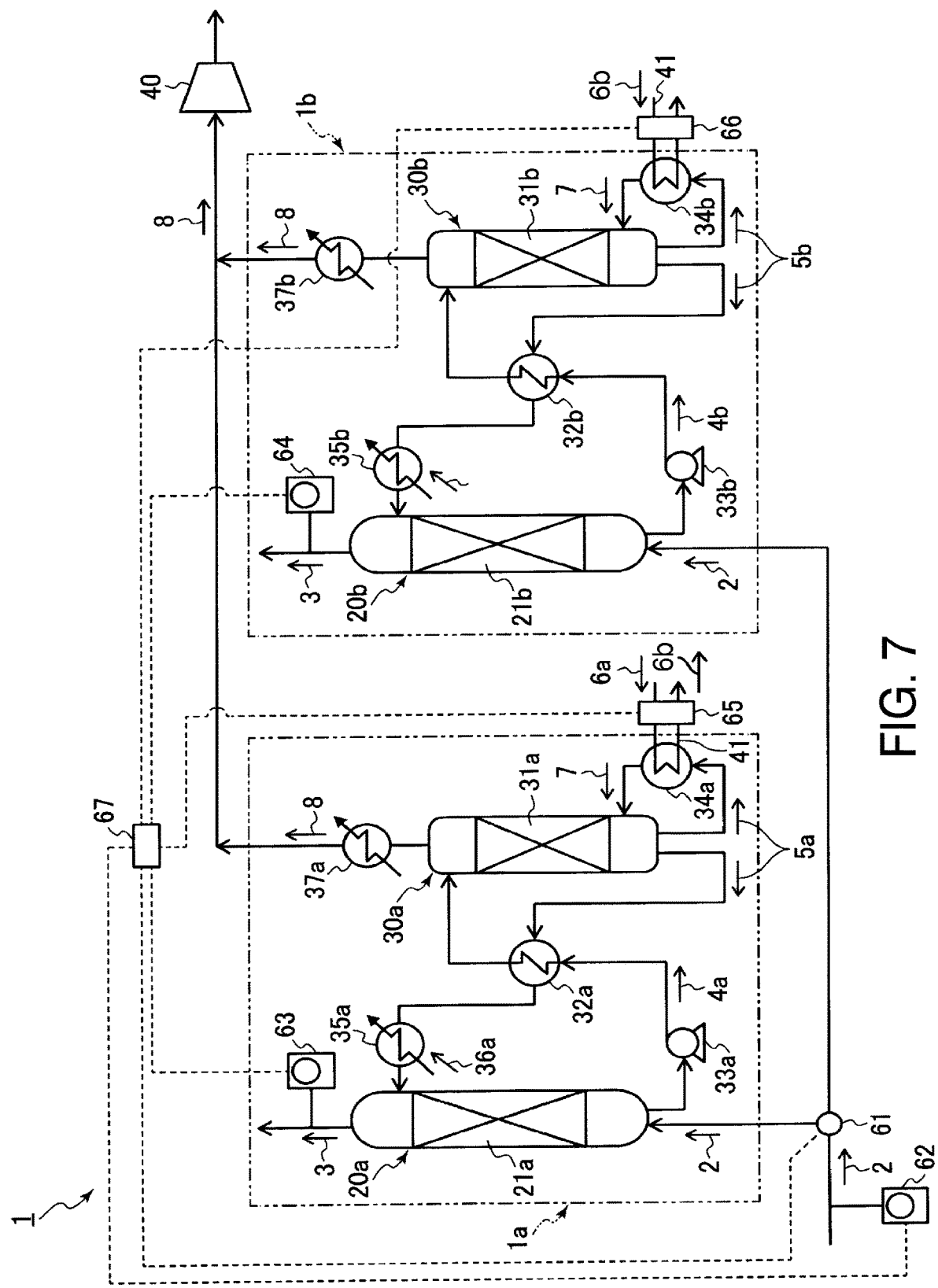
FIG. 7 is a schematic drawing of a sixth embodiment of a carbon dioxide capture system.

FIG. 7 shows a schematic diagram of a system according to the sixth embodiment in which a flow control device 61 is further provided. The flow control device 61 controls the first flow amount of the combustion exhaust gas 2 supplied to the first absorber 20a and the second flow amount of the combustion exhaust gas 2 supplied to the second absorber 20b. As shown in FIG. 7, the flow control device 61 could be provided at the branching point of the combustion exhaust gas 2 supplied to the first absorber 20a and the second absorber 20b. Or the flow control device 61 could be composed by control bulbs provided downstream of the branching point of the combustion exhaust gas 2.

Furthermore, in his embodiment, an inlet concentration meter 62 may be further provided. The inlet concentration meter 62 measures the carbon dioxide concentration of the combustion exhaust gas 2 supplied to the first absorber 20a and second absorber 20b. And a first outlet concentration meter 63 and a second outlet concentration meter 64 may be further provided. The first outlet concentration meter 63 measures the carbon dioxide concentration of the decarbonated combustion exhaust gas 3 discharged from the first absorber 20a. The second outlet concentration meter 64 measures the carbon dioxide concentration of the decarbonated combustion exhaust gas 3 discharged from the second absorber 20b. By measuring the carbon dioxide concentration by these concentration meters, a percentage of carbon dioxide captured by the carbon dioxide capture system 1 is calculated at controller 67 (explained below).

A first heat amount calculator 65 and a second heat amount calculator 66 may be further provided. The first heat amount calculator 65 and the second heat amount calculator 66 may include a programmable processor and a memory. The first heat amount calculator 65 calculates the heat amount supplied to the first reboiler 34a. The second heat amount calculator 66 calculates the heat amount supplied to the second reboiler 34b. The first heat amount calculator 65 measures the flow amount, the pressure and the temperature of the first heating medium 6a which is supplied to the first reboiler 34a. The first heat amount calculator 65 also measures the flow amount, the pressure and the temperature of the first discharged heating medium 6b after it is discharged from the first reboiler 34a. As with the first heat amount calculator 65, the second heat amount calculator 66 measures the flow amount, the pressure and the temperature of the heating medium before and after it is supplied to the second reboiler 34b.

Furthermore, a controller 67 is provided. The signals of carbon dioxide concentration measured at the inlet concentration meter 62, the first outlet concentration meter 63 and the second outlet concentration meter 64 are sent to the controller 67. The signals of the flow amount, the pressure and the temperature measured at the first heat amount calculator 65 and second heat amount calculator 66 are also sent to the controller 67.

The controller 67 controls the first flow amount of the combustion exhaust gas 2 and second flow amount of the combustion exhaust gas 2 so that the total value of the heat amount supplied to the first reboiler 34a and the second reboiler 34a is minimized.

In particular, the controller 67 calculates the first flow amount and the second flow amount so that the total value of the heat amount supplied to the reboiler 34a,b becomes a minimum value. For example, the relation between the first flow amount, second flow amount and the total heat amount supplied to the reboiler 34a,b, are measured and memorized at the controller 67 in advance, and the controller 67 seeks the value of the first flow amount and the second flow amount at which the total value of the heat amount supplied to the first reboiler 34a and the second reboiler 34b becomes a minimum value.

The heat amount supplied to the first reboiler 34a is calculated by the difference between the heat amount of the first heating medium 6a before it is supplied to the first reboiler 6a and the heat amount of the first discharged heating medium 6b after it is discharged from the first reboiler 34a.

Especially, in the case that the first heating medium 61 is saturated vapor, the weight ratio of the first heating medium 6a is calculated by the flow amount and the pressure of the first heating medium 6a before it is supplied to the first reboiler 34a. The weight flow amount is calculated by the weight ratio, and the heat amount of the first heating medium 6a before it is supplied to the first reboiler 34a is calculated by the weight flow amount and the temperature. The heat amount of the first discharged heating medium 6b after it is discharged by the first reboiler 34a is calculated in the same way. After this process, the heat amount supplied to the first reboiler 34a is calculated based on the difference between the heat amount of the first heating medium 6a before it is supplied to the first reboiler 34a and the heat amount of the first discharged heating medium 6b after it is discharged from the first reboiler 34a.

The heat amount supplied to the second reboiler 34b is calculated by the difference between the heat amount of the first discharged heating medium 6b before and after it is supplied to the second reboiler 34b.

In this embodiment, the controller 67 controls the first flow amount of the combustion exhaust gas 2 and second flow amount of the combustion exhaust gas 2 so that the total value of the heat amount supplied to the first reboiler 34a and the heat amount supplied to the second reboiler 34a is minimized. By this process, the heat supplied to the carbon capture system 1 as a whole is reduced.

Instead of the case that the first heating medium 6a is saturated vapor, in the case that the first heating medium 6a is heated vapor, the weight ratios are calculated by the pressure and the temperature of the heated vapor, and the heat amounts are calculated by the weight ratios of the heated vapor.

The case that the first discharged heating medium 6b discharged from the first reboiler 34a is supplied to the second reboiler 34b as the second heating medium was explained above. However, the disclosed embodiments are not limited to this case. For example, an external heating medium could be supplied as the second heating medium supplied to the second reboiler 34b. In this case, the controller 67 also controls the first flow amount of the combustion exhaust gas 2 and second flow amount of the combustion exhaust gas 2 so that the total value of the heat amount supplied to the first reboiler 34a and the heat amount supplied to the second reboiler 34a becomes a minimum value.

A more complete appreciation of the invention and many of the attendant advantages thereof will be readily obtained as the same becomes better understood by reference to the following detailed description when considered in connection with the accompanying drawings, wherein.

What is claimed is:

1. A carbon dioxide capture system comprising:
a first capture system including
a first absorber configured to cause carbon dioxide contained in a combustion exhaust gas to be absorbed in a first absorbing liquid to produce a first rich liquid, and
a first stripper configured to cause the carbon dioxide to be released from the first rich liquid produced by the first absorber;
a second capture system, provided in parallel with the first capture system, including
a second absorber configured to cause carbon dioxide contained in a combustion exhaust gas to be absorbed in a second absorbing liquid to produce a second rich liquid, and
a second stripper configured to cause the carbon dioxide to be released from the second rich liquid produced by the second absorber;
a line separately supplying the combustion exhaust gas into the first absorber of the first capture system and the second absorber of the second capture system,
a maintenance bulb controlling the pressure in the first stripper,
a compressor compressing the carbon dioxide from the first and the second stripper, and
an exhaust line connecting the first stripper and the second stripper to the compressor,
wherein a temperature at which the second rich liquid releases carbon dioxide is lower than a temperature at which the first rich liquid releases carbon dioxide,
wherein the exhaust line includes a first exhaust line extending from the first stripper, a second exhaust line extending from the second stripper, and a connecting point connecting the first exhaust line and the second exhaust line,
wherein the maintenance bulb is provided on the first exhaust line, and
wherein the opening of the maintenance bulb is adjusted so that the pressure in the first stripper is higher than the pressure in the second stripper.

2. The carbon dioxide capture system according to claim 1, further comprising:
a first reboiler that heats the first absorbing liquid by a first heating medium and discharging the first heating medium as a first discharged heating medium; and
a second reboiler that heats the second absorbing liquid by the first discharged heating medium discharged from the first reboiler.

3. The carbon dioxide capture system according to claim 2, further comprising:
a flashing device that flashes the first discharged heating medium discharged from the first reboiler and supplied to the second reboiler.

4. The carbon dioxide capture system according to claim 2,
wherein the second reboiler heats the second absorbing liquid by the first discharged heating medium, and
the carbon dioxide capture system further comprises:
a third reboiler that heats the first discharged heating medium that heats the second reboiler.

* * * * *